United States Patent [19]

De Cortanze

[11] Patent Number: 4,553,622
[45] Date of Patent: Nov. 19, 1985

[54] SUPPORTING ARM ASSEMBLY FOR A DRIVING WHEEL OF AN AUTOMOTIVE VEHICLE

[75] Inventor: André De Cortanze, Chevry, France

[73] Assignee: Elf France, Paris, France

[21] Appl. No.: 528,582

[22] Filed: Sep. 1, 1983

[30] Foreign Application Priority Data

Sep. 17, 1982 [FR] France .................. 82 15728

[51] Int. Cl.[4] ............................... B60G 7/02
[52] U.S. Cl. ........................ 180/227; 180/72; 180/226; 188/18 A; 280/286
[58] Field of Search ............ 180/71, 72, 217, 219, 180/226, 227, 230, 231, 73.4; 280/284, 286; 474/112; 188/18 A, 344

[56] References Cited

U.S. PATENT DOCUMENTS

| | | | |
|---|---|---|---|
| 1,927,088 | 9/1933 | Gerlinger | 180/72 |
| 2,420,836 | 5/1947 | Nelson, Jr. | 474/112 |
| 2,522,867 | 9/1950 | Goldammer et al. | 280/284 |
| 4,199,042 | 4/1980 | Kibler | 188/18 A |

Primary Examiner—Joseph F. Peters, Jr.
Assistant Examiner—Kenneth R. Rice
Attorney, Agent, or Firm—Burgess, Ryan & Wayne

[57] ABSTRACT

An oscillating supporting arm assembly for the driving wheel of a motorcycle, includes an arm mounted to oscillate angularly about a connecting shaft of the motorcycle and cooperating with a suspension assembly between the arm and motorcycle, the wheel being removably fixed to a supporting shaft on one side of the free end of the supporting arm, the supporting shaft extending through the arm on two bearings, a wheel driving pinion is fixed to the supporting shaft, on the side of the arm opposite to the wheel and is driven by a chain mechanically connected to the driving assembly of the motorcycle, the supporting arm having the configuration of a U with two legs between which the rim and the tire of the rear wheel are located, one of the legs having hinge connections which cooperate with the connecting shaft of the motorcycle, the wheel has its median plane extending at substantially equal distances from the two hinge connections of the supporting arm, the wheel is rigidly connected to a brake disc cooperating with brake tightening mechanism fixed to the supporting arm and wherein the brake disc is mounted substantially on the longitudinal axis of the motorcycle coinciding equally with the transverse median plane of the wheel so as to limit the torsion of the supporting arm and the reactions to the braking forces.

6 Claims, 1 Drawing Figure

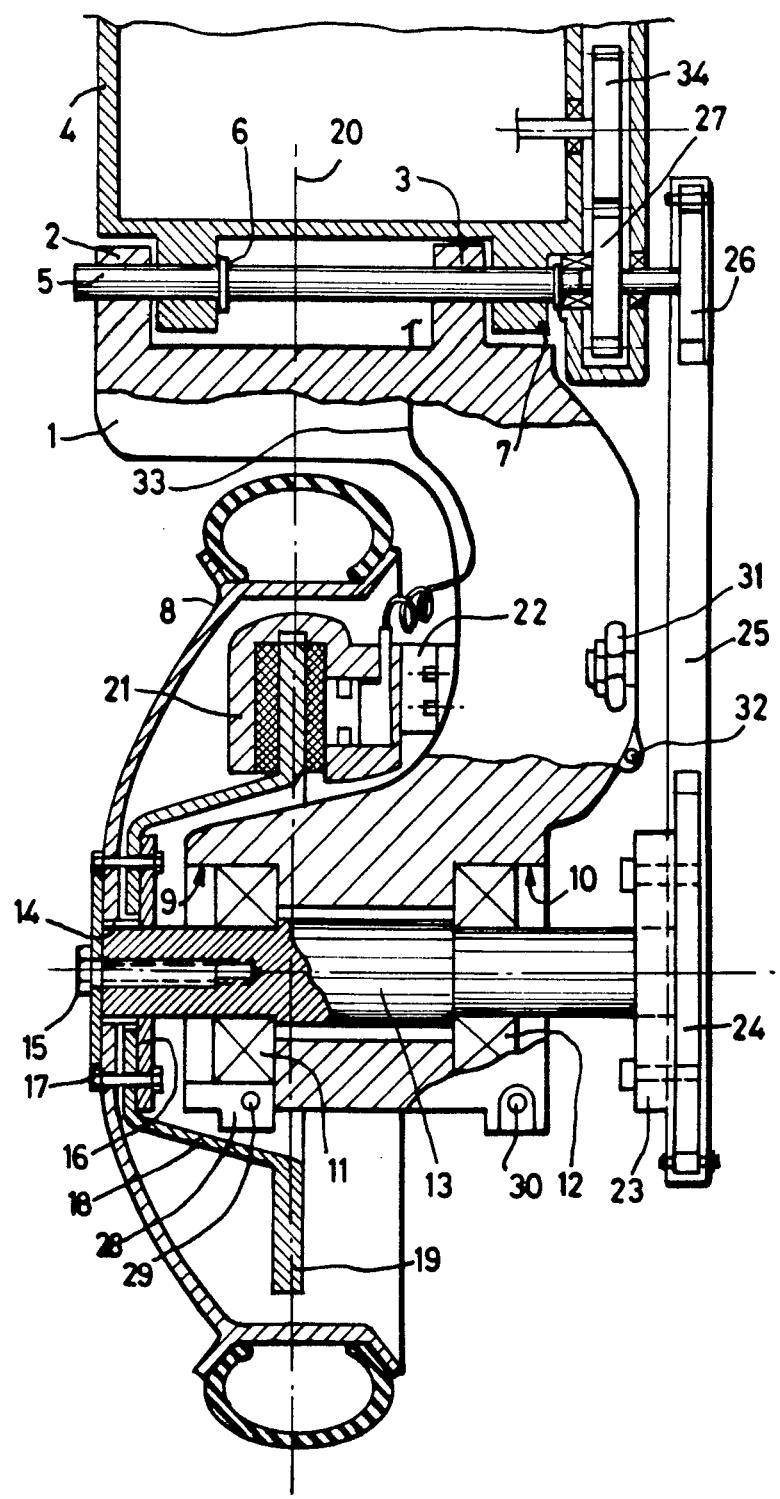

SUPPORTING ARM ASSEMBLY FOR A DRIVING WHEEL OF AN AUTOMOTIVE VEHICLE

BACKGROUND OF THE INVENTION

The present invention relates to a supporting arm for the driving wheel of a vehicle comprising a suspension which oscillates by an angular motion of the arm about an axis connecting it to the body of the vehicle.

Suspensions of this type are now currently used in automotive vehicles, and the driving wheel is usually rotated by means of a shaft extending through the supporting arm and connected to a driving organ through a cardan or homocinetic joint allowing it to absorb the angular oscillations of the arm, which bring about variations of the length and the inclination of the shaft.

When it is desired to apply such a driving wheel suspension to a motor cycle, a solution is generally proposed, which consists in connecting the wheel to a supporting shaft mounted onto the arm by means of bearings, said supporting shaft being integral with a conical toothed crown wheel which is mechanically connected to the driving motor through a shaft supported by the arm and integral, in turn, with a conical pinion which meshes with the conical crown wheel.

An assembly of this kind is reliable, but the mechanical connections between the motor and the driving wheel are difficult to achieve and expensive.

It is thus one of the objects of the invention to provide a motor cycle rear driving wheel suspension assembly comprising a rotative supporting arm, this driving wheel being adapted to be driven by a chain, which constitutes up to now the most simple and reliable driving means for bicycles and motor cycles, since it is able to undergo comparatively large offsets and variations of the distance between the axes.

SUMMARY OF THE INVENTION

To this end the invention provides a rotative supporting arm assembly for the driving wheel of a vehicle, such as the rear suspension arm of a motor cycle, which is adapted to oscillate angularly about a connecting axis integral with the body or frame of the vehicle, so as to cooperate with suspension and/or damping means with a view to suspending the body or frame of the vehicle with respect to the wheel, said wheel being fixed, on one side of the supporting arm in an easily removable manner, by any convenient means, such as a fixing bolt or screw, to a supporting shaft extending through said arm on two bearings having a high rigidity, such as conical roller bearings, while a wheel driving pinion is fixed onto the supporting shaft, on the other side of the arm, so as to allow easy dismounting of the wheel on the side of the supporting arm without acting on the wheel driving means, said driving means not being located in said arm and consequently not increasing the space requirement thereof said supporting arm having the general configuration of a U, said wheel having an enveloping cross section with respect to the supporting arm, so as to allow the rim and the tire of said rear wheel to be located within the branches of the U, while providing a sturdy hinging connection with the vehicle body, said wheel being mounted, as known per se, in such a manner that its median plane extends at substantially equal distances from two hinge bearings connecting the supporting arm to the connecting shaft which is locked with the vehicle body, so as to limit the torsional moment of the arm under the effect of the reaction forces applied to it by the wheel.

The wheel—at least when fixed to the supporting shaft—may be fixed to a brake disc cooperating with a brake disc clamping or tightening organ, such as a brake yoke, which is fixed to said supporting arm. In a modified embodiment the brake disc is fixed to the wheel supporting shaft, and the wheel is fixed to the hub of the brake disc.

According to another embodiment of the supporting assembly according to the invention, two bearings having a high rigidity and supporting the shaft which carries the wheel and the driving means are rigidly locked to a mounting bore provided in said arm, by means of a lateral slot of the arm, which opens into said bore and the two edges of which are adapted to be brought near to each other by preferably adjustable tightening means, such as a tightening or clamping collar, or at least one screw or bolt extending through said slot.

IN THE DRAWING

Other object, advantages and features of the invention will become apparent from the following description of an embodiment of the invention, referring to the appended drawing, and given by way of illustration, but not of limitation.

The single FIGURE of the drawing shows, in section and viewed from above, the supporting arm assembly of the rear driving wheel of a motor cycle.

DETAILED DESCRIPTION

The supporting arm 1 is connected by bosses 2 and 3 to the housing 4 of the motor of a motor cycle by means of a connecting shaft 5 which extends through corresponding bosses of said housing. Connecting shaft 5 is held in its position with respect to housing 4 by any convenient means, such as a circlip 6 associated with an abutment provided on a pinion shaft and cooperating with one lateral face of the bosses 7 of housing 4.

Viewed from above, as shown, supporting arm 1 has the general configuration of a U, so as to allow the rim and the tire of the rear wheel 8 of the motor cycle to be placed within the space defined between the branches, or legs, of the U, while yet being hingedly, or pivotally, connected in a sturdy manner to housing 4 of the motor.

At its free end opposed to the hinged connection with shaft 5, arm 1 is provided with bores 9 and 10 opening into each one of its lateral faces, one high-strength bearing, such as a conical roller bearing 11, 12 being disposed in each one of said bores and adapted to carry and guide a supporting shaft 13 which entirely extends through arm 1. On the left side of the FIGURE shaft 13 is connected, by means of grooves 14 and a clamping screw 15, to wheel 8. Shaft 13 generally carries, on the left side of the FIGURE, a flange 16 on which the hub 18 of a brake disc 19 is fastened by means of studs 17 which, according to a particular embodiment, may also be used as wheel clamping studs.

The brake disc 19 is mounted substantially on the longitudina axis 20 of the motor cycle, which axis also coincides with the transverse median plane of the wheel, so as to limit the torsion of arm 1 and the reactions to the braking forces. Disc 19 cooperates with a brake caliper 21 which is attached to a mounting pad 22 integral with arm 1.

On the right side of the FIGURE supporting shaft 13 is fixed by a removable flange 23 to a driven chain pinion 24 connected through an associated chain 25 to a chain driving pinion 27 mounted in housing 4. Driving pinion 26 is substantially coaxial with respect to connecting shaft 5, so that during the angular (rotating) movements of supporting arm 1 about said axis 8, resulting from the oscillating motion of the suspension assembly of the motor cycle, the distance between the axes of chain pinions 24 and 26, respectively, will remain substantially constant.

A lateral slot 28 allowing the tightening of the walls of bores 9, 10, respectively by means of a tightening or clamping screw 29, 30 for firmly holding bearings 11, 12 opens into each one of bores 9 and 10 containing said roller bearings 11 and 12. Furthermore, arm 1 carries connecting bosses 31, 32 adapted to be connected, respectively, to a suspension spring and a damping means (not shown), as well as a braking pipe 33 connected to housing 4 by a flexible hose on account of the oscillations of the arm.

It will be understood by studying the FIGURE that under the combined effects of the load acting on wheel 8 and the reaction forces of the suspension (not shown) arm 1 and wheel 8 are able to rotate about connecting shaft 5, while all the reactions are applied to said shaft 5. Due to its U-shaped configuration the suspension arm entirely surrounds brake caliper 21 and wheel 8, so as to reduce the space requirement of the rear part of the vehicle.

In the case of an incident concerning the wheel, such as a puncture, it is only necessary to unscrew screw 15 so as to be able to withdraw immediately wheel 8. After withdrawal of wheel 8 it is also possible to pivot brake caliper 21, and to withdraw rapidly brake disc 19. This improved accessibility of the wheel and the brakes is particularly appreciable during racing competitions, but it also contributes to reduce the maintenance expenses for ordinary vehicles. It is further possible to withdraw driven chain pinion 24 from the associated mounting flange 23 by unscrewing the fixing screws or bolts attaching said pinion to said flange. Driven pinion 24 may be mounted in its working position while chain 25 is engaged on both chain pinions 24 and 26, whereby the assembling operation is facilitated and any chain tightening problems are eliminated. It should be noted that the supporting arm assembly according to the invention operates correctly when pinion 26 is not directly coaxial with respect to connecting shaft 5, but is, for example, mounted coaxially with respect to an intermediary pinion 34. In these conditions the chain 25 need only be mounted with a normal slack while being able to absorb not only any axial offset, but also the slight variations of the distance between the axes which occur on account of the limited rotation of arm 1 about connecting shaft 5.

The invention is not limited to the embodiments shown and described herein-above; many variants and modifications may be envisaged by those skilled in the art without departing from the spirit and scope of the invention as defined in the appended claims.

What is claimed is:

1. An oscillating supporting arm assembly for the driving wheel of a motorcycle, comprising an arm mounted to oscillate angularly about a connecting shaft of said motorcycle and cooperating with suspension means between said arm and motorcycle, said wheel being removably fixed to a supporting shaft on one side of the free end of the supporting arm, the supporting shaft extending through said arm on two bearings, a wheel driving pinion is fixed to the supporting shaft, on the side of the arm opposite to the wheel and is driven by a chain mechanically connected to the driving means of the motorcycle, said supporting arm having the configuration of a U with two legs between which the rim and the tire of said rear wheel are located, one of the legs having hinge connections which cooperate with the connecting shaft of the motorcycle, said wheel has its median plane extending at substantially equal distances from the two hinge connections of the supporting arm, the wheel is rigidly connected to a brake disc cooperating with brake tightening means fixed to said supporting arm and wherein the brake disc is mounted substantially on the longitudinal axis of the motorcycle coinciding equally with the transverse median plane of the wheel so as to limit the torsion of the supporting arm and the reactions to the braking forces.

2. An assembly according to claim 1, wherein said wheel is mounted on the supporting shaft extending through said arm, with a brake disc cooperating with a brake tightening means, such as a brake yoke fixed to said supporting arm.

3. An assembly according to claim 1, wherein said brake disc is fixed to the supporting shaft, and said wheel is fixed to the hub of the brake disc.

4. An assembly according to claim 1, wherein the two bearings having a high rigidity and supporting the wheel supporting shaft are rigidly locked in a bore provided in said arm, by means of a lateral slot of said arm, which opens into said bore and the edges of which are adapted to be brought near to each other by adjustable tightening means.

5. The assembly of claim 4, wherein said adjustable tightening means comprises at least one bolt extending through said slot.

6. The assembly of claim 4, wherein said adjustable tightening means comprises a clamping collar.

* * * * *